Sept. 22, 1925.
B. H. SCHIELDROP
GLASS MELTING FURNACE
Filed Feb. 24, 1923
1,554,251
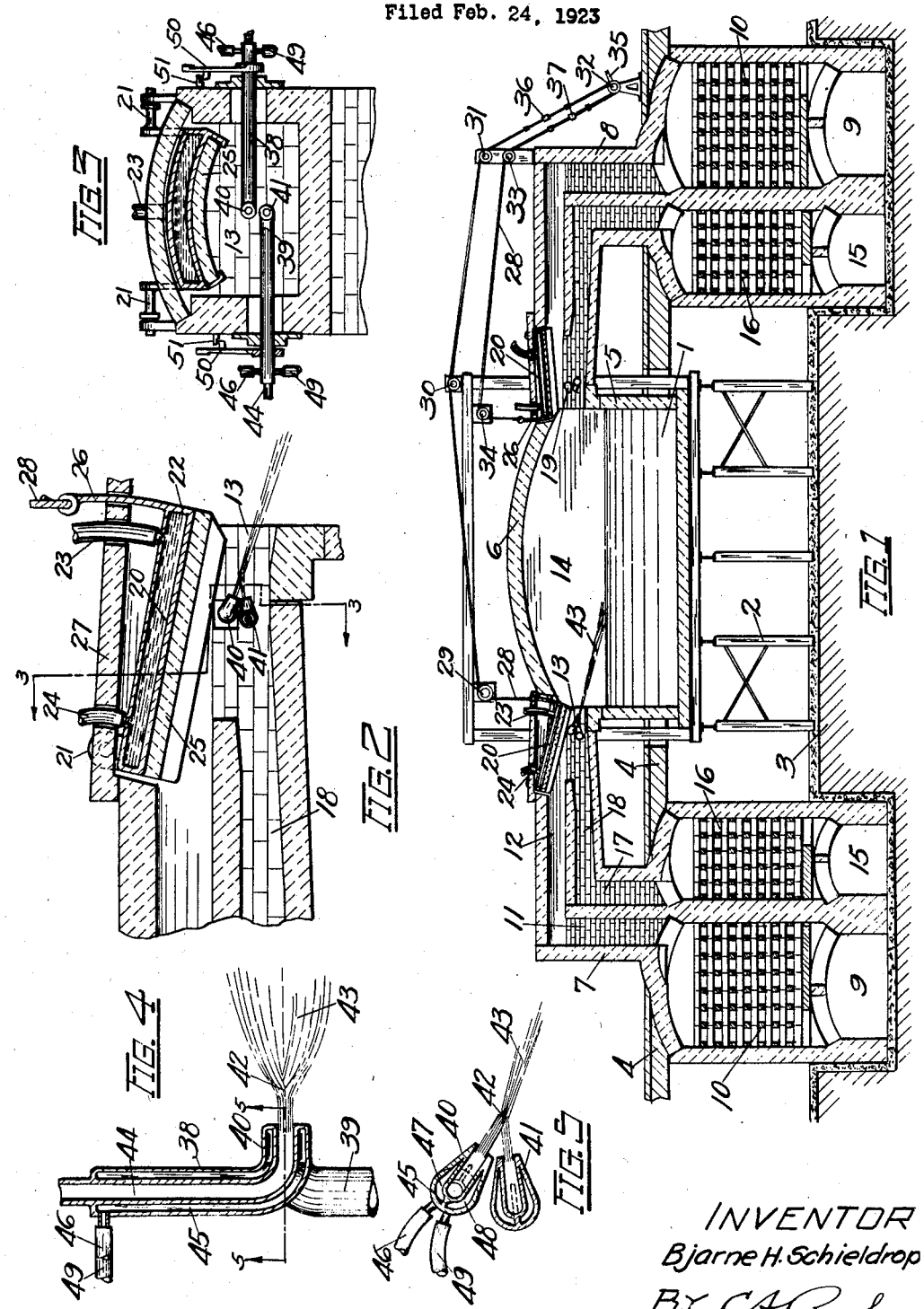
INVENTOR
Bjarne H. Schieldrop
BY C.H. Rowley
ATTORNEY Patented Sept. 22, 1925.

1,554,251

UNITED STATES PATENT OFFICE.

BJARNE H. SCHIELDROP, OF CHARLESTON, WEST VIRGINIA, ASSIGNOR TO THE LIBBEY-OWENS SHEET GLASS COMPANY, OF TOLEDO, OHIO, A CORPORATION OF OHIO.

GLASS-MELTING FURNACE.

Application filed February 24, 1923. Serial No. 620,863.

*To all whom it may concern:*

Be it known that I, BJARNE H. SCHIELDROP, a subject of the King of Norway, residing at Charleston, in the county of Kanawha and State of West Virginia, have invented new and useful Improvements in Glass-Melting Furnaces, of which the following is a specification.

This invention relates to glass-melting furnaces, and more particularly to improved and more efficient means for supplying heat to such furnaces.

One object of this invention relates to means for varying the effective size of the port or opening through which the gas and air enter the furnace, also to similar means for varying the effective size of the outlet port. Another object is to provide means whereby the effective size of the openings of the outlet and inlet ports of a pair of cooperating regenerators may be oppositely and simultaneously varied when the direction of flow of the heating gases is reversed.

Another object is to provide improved means for delivering the gas to the furnace, in the inlet port, so that the flames may be given a more effective shape for efficiently and uniformly melting the glass batch. A further object is to provide means whereby the angle at which these flames engage the molten glass, or glass forming materials, may be varied, as well as the inclination at which the heated air is delivered at the point of combustion.

Other objects and advantages will be apparent from the following detailed description of one approved form of apparatus embodying the principles of this invention.

In the accompanying drawings:

Fig. 1 is a transverse vertical section through a regenerative glass-melting furnace, the section being taken through a pair of opposite cooperating regenerators.

Fig. 2 is an enlarged vertical section through the portion of one of these regenerators adjacent the furnace, showing the port or passage through which the gas and air are delivered to the furnace.

Fig. 3 is a transverse vertical section through Fig. 2, taken substantially on the line 3—3.

Fig. 4 is a detail plan view of the pair of gas burner pipes, one of the pipes being shown in horizontal section.

Fig. 5 is a vertical section taken substantially on the line 5—5 of Fig. 4.

The furnace installation, shown by way of example in Fig. 1, is of a well-known standard type comprising the tank or melting chamber 1, supported by suitable frames or up-rights 2 above the ground or foundation 3. The tank 1 projects up through the working floor 4 and comprises side walls 5 and cover arch 6. Communicating with the two opposite sides of this tank are a series of cooperating pairs of regenerators, one pair 7 and 8 being shown in vertical section in Fig. 1. These regenerators are identical in construction one with another and a description of one will suffice for all. Referring to regenerator 7, air is drawn in through the tunnel 9 and after passing up through the heated checker-work 10 and passages 11 and 12, is delivered through the port or opening 13 to the chamber 14 above the glass, or glass producing materials, in tank 1. If artificial or producer gas is used, this gas may be drawn in through tunnel 15, heated checker-work 16, passages 17 and 18, to the port or opening 13. The heating gases produced by the combustion of this air and gas will be drawn across the chamber 14 and the products of combustion will pass out through the opposite port 19, heating the checker-works 10 and 16 of regenerator 8, and passing out through tunnels 9 and 15 to the stack. At intervals, the direction of flow of the gases is reversed, the combustion now taking place at port 19 and the heated gases passing out through the opposite port 13 and heating up the checker-work 10 and 16 in the regenerator 7 first used. If natural gas, or other gas not requiring preheating is used, this gas may be introduced through burner pipes in the walls of the passage adjacent ports 13 or 19. In such case, the tunnel 15, checker-work 16, and passages 17 and 18, may be left idle or may be used for delivering air either with, or alternative to, the air passages 9, 10, 11, and 12. All of the above is construction well-known in this art.

The furnace will usually operate more efficiently if the inlet port, shown at 13, is smaller than the outlet port, shown at 19. The smaller inlet port has a concentrating nozzle effect upon the gases entering the furnace, giving an increased velocity and definite direction thereto. Since the waste gases and products of combustion have a larger bulk than the fuel gases fed to the furnace, the draft through the stack will operate more effectively if exit port 19 is of larger cross-section or capacity than the inlet port 13. However, since the opposite pair of ports have their functions reversed at short intervals, that is, they serve alternately as inlet and exit ports for the gases, these ports cannot be given the fixed dimensions noted above, but should be capable of having their size varied according to the purpose they are being used for at the time. Furthermore, the most effective size of inlet port will vary according to the type and proportions of the furnace or tank with which they are used, and it is also desirable to adjust this size at times to meet varying conditions in the same tank.

To satisfy the above requirements in the furnace here shown, a portion of one wall of the inlet passage is made movable so that the inlet port may be more or less cut off and the effective size of the inlet passage varied. In the example here shown, an inner or auxiliary roof portion 20 is swung from hinges 21 at its rear end so that the forward end 22 may be dropped downwardly giving any desired inclination to the roof of the passage. This auxiliary roof member is preferably formed of some heat-resisting metal, and is made hollow and water-cooled, the cooling fluid passing in through pipe 23 and out through pipe 24. Preferably the lower surface of this roof member is lined with a plate of refractory or other heat-resisting material 25. An ear or extension 26 projects up from the forward end of this swinging roof member, through the stationary roof member 27, and by means of a cable or other connection 28 attached to the ear 26, the hinged member 20 may be raised or lowered as desired and held in this position. As here shown, the cable 28 passes from the hinged member 20 and regenerator 7 over suitable direction pulleys 29, 30 and 31, to a drum 32, mounted at some convenient place on working floor 4. The cable then passes back from this drum over direction pulleys 33 and 34 to the ear 26 on the opposite roof member 20 of regenerator 8. When the drum 32 is rotated by crank 35 or any other suitable means, one of the roof members 20 will be lowered and the other raised a corresponding amount. In this way when the direction of fire is reversed, the roof section 20 over the outlet port 19, which is now to be the inlet port, will be lowered to the proper position and simultaneously the roof section 20 over port 13, which is now changed from the inlet or the outlet port, will be elevated. Suitable turn-buckles, or similar connections, 36 and 37 are provided in the two leads of the cable loop near the drum 32. By manipulating turn-buckle 36, the exact position of the swinging member 20 over port 13 may be varied independently of the member 20 over port 19. In the same way, the hinged roof-member over port 19 may be independently adjusted by means of turn-buckle 37. It is to be understood that the adjusting mechanism here illustrated is merely one example of many that might be employed for raising or lowering these roof sections.

It is preferable to use natural gas when the same is available. In usual constructions of this type, the gas is fed in through a pair of suitable burner pipes, one projecting through each side wall of the regenerator passage adjacent the inlet port 13. These burner pipes do not, however, project completely into the passage, the heat within being too intense for the metallic pipes. When these two flames, which come in at angles from the opposite side walls of the regenerator meet over the surface of the molten mass in the tank, they are "fanned" out or flattened more or less in a vertical plane so that one sharp edge of the resulting fan-shaped flame engages the mass of glass or glass producing materials. This is undesirable as it tends to concentrate too much heat in one spot instead of spreading the heat uniformly over the surface of the glass. It would be more desirable to have this flame flattened out or "fanned" in a plane at right angles to the vertical. In the improved construction embodied in the furnace here shown, the two gas-feeding pipes 38 and 39 are extended to a central point in the inlet passage and terminate in nozzles 40 and 41, respectively, arranged one above the other. By adjusting the nozzles 40 and 41 at the proper relative angle, the streams of gas fed therefrom will impact at a point such as 42 (Figs. 4 and 5), to produce a flat fan-shaped flame 43 which is substantially horizontal or parallel to the surface of the molten glass in the tank. When this flame is directed down toward the surface of the molten glass, it will spread out over a wide surface, exerting a more uniform melting effect over a large area instead of being concentrated in one spot as is the case when the fan-shaped flame is turned vertically. Those portions of the gas supply pipes 38 and 39 which project into the inlet passage 13 are water-jacketed to protect them from the intense heat at this point. As shown more particularly in Figs 4 and 5, the inner gas passage 44 is surrounded by a water-jacket which is divided by the partition or baffle-plate 45 into two separate semi-cylindrical halves or passages. The partition 45 terminates near the end of nozzle 40 so that the water or other cooling fluid which flows in through pipe 46 to the passage or chamber 47 at one side of partition 45, will flow to the end of nozzle 40, thence around the end of baffle 45 to the passage 48 at the other side of partition 45, and back to the outlet pipe 49. In this way, a constant circulation of the cooling fluid is maintained around this portion of the supply pipe and it will be cooled just sufficiently to withstand the intense heat of the passage 13 without undesirably reducing the temperature of the gas flowing in through pipe 44. Each burner pipe 38 or 39 is independently supported adjacent its respective wall of passage 13 and is provided with an adjusting lever 50 cooperating with rack 51 to hold the burner 38 or 39 in any desired rotary position. In this way, the inclination of the nozzles 40 and 41 may be varied as desired to position the contact point 42 of the two flames at the most effective point and also to vary the angle of the flame 43 with the surface of the molten mass in tank 1. Also by varying the inclination of the hinged roof member 20, the angle at which the heated air is delivered to the point of combustion may also be varied in accordance with the inclination of the burner pipes 38 and 39. In this way, the most effective delivery angles for the gas and air may be experimentally ascertained, and varied from time to time in accordance with varying air or gas pressures or other changing conditions.

The swinging roof members 20 are not only useful in changing the size of the regenerator ports when their function is reversed from inlet to outlet ports or vice-versa, but are also useful in determining the most effective size of inlet or outlet port for use with a new design of furnace. It is only possible, in advance, to calculate approximately the most desirable proportions for these ports, and it is a very slow and expensive process to rebuild these ports to try out different proportions for these passages after the tank is once in operation. If hinged roof sections, as shown at 20, are installed on the furnace, the size of the ports may be varied at will until the most effective passages are obtained. The sections 20 may then be fixed more or less permanently in this position if desired, and will serve as models for permanently designed regenerator passages in another tank of the same design and proportions.

Claims:

1. In a glass melting furnace, a gas passage leading to a port communicating with the melting chamber, the passage comprising a swinging roof section for varying the effective opening of the port.

2. In a glass melting furnace, a gas passage leading to a port communicating with the melting chamber, the passage comprising a hinged roof section, having a water-cooled supporting frame and a lining of refractory material on its lower face, for varying the effective opening of the port.

3. In a regenerative glass melting furnace, a pair of cooperating ports, and a gas passage leading to each, serving alternately to conduct gas and air to the furnace, or as an outlet for the products of combustion, each passage comprising a hinged roof section whereby the effective size of the port may be decreased when serving as a gas inlet, and increased when serving as an outlet.

4. In a regenerative glass melting furnace, a pair of cooperating ports, and a gas passage leading to each, serving alternately to conduct gas and air to the furnace, or as an outlet for the products of combustion, each passage comprising a hinged roof section whereby the effective size of the port may be decreased when serving as a gas inlet, and increased when serving as an outlet, and means for simultaneously adjusting these two sections in opposite directions.

5. In a regenerative glass melting furnace, a pair of cooperating ports, and a gas passage leading to each, serving alternately to conduct gas and air to the furnace, or as an outlet for the products of combustion, each passage comprising a hinged roof section whereby the effective size of the port may be decreased when serving as a gas inlet, and increased when serving as an outlet, and means for independently adjusting each section.

6. In a glass melting furnace, an enclosed passage for conducting heated air to the furnace, gas feeding means projecting into the passage near its entrance to the furnace, said means comprising a pair of nozzles positioned one above the other so that the two streams of gas will be directed into the furnace along converging lines in the same vertical plane.

7. In a glass melting furnace, an enclosed passage for conducting heated air to the furnace, gas feeding means projecting into the passage near its entrance to the furnace, said means comprising a pair of nozzles positioned one above the other so that the two streams of gas will be directed into the furnace along converging lines in the same vertical plane, and means for adjusting the nozzles to vary the inclination of the resulting fan-shaped flame with respect to the surface of the molten glass.

8. In a glass melting furnace, an enclosed passage for conducting heated air to the furnace, gas feeding means projecting into the passage near its entrance to the furnace, said means comprising a pair of nozzles positioned one above the other so that the two streams of gas will be directed into the furnace along converging lines in the same vertical plane, and means for independently swinging the nozzles in a vertical plane to vary the point of contact of the two flames, or to vary the inclination of the resulting fan-shaped flame with respect to the surface of the molten glass.

9. In a glass melting furnace, an enclosed passage for conducting heated air to the furnace, gas feeding means projecting into the passage near its entrance to the furnace, said means comprising a pair of nozzles positioned one above the other so that the two streams of gas will be directed into the furnace along converging lines in the same vertical plane, and means for water-cooling those portions of the gas feeding means within the passage.

10. In a glass melting furnace, an enclosed passage for conducting heated air to the furnace, the roof of the passage adjacent the entrance to the furnace being hinged so that the effective passage opening to the furnace, as well as the inclination at which the heated air is directed to the furnace may be varied, and gas feeding means projecting into the passage near its entrance to the furnace, said means comprising a pair of nozzles positioned one above the other so that the two streams of gas will be directed into the furnace along converging lines in the same vertical plane, and means for adjusting the nozzles to vary the inclination of the resulting fan-shaped flame with respect to the surface of the molten glass.

11. In a glass melting furnace an enclosed passage for conducting heated air to the furnace, a pair of gas pipes projecting into the passage near its entrance to the furnace, each pipe terminating in a gas-feeding nozzle, the nozzles being positioned one above the other so that the two streams of gas will be directed into the furnace along converging lines in the same vertical plane.

12. In a glass melting furnace, an enclosed passage for conducting heated air to the furnace, a pair of gas pipes projecting into the passage near its entrance to the furnace, each pipe terminating in a gas-feeding nozzle, the nozzles being positioned one above the other so that the two streams of gas will be directed into the furnace along converging lines in the same vertical plane, and means for adjusting the nozzles to vary the inclination of the resulting fan-shaped flame with respect to the surface of the molten glass.

13. In a glass melting furnace, an enclosed passage for conducting heated air to the furnace, a pair of gas pipes projecting into the passage near its entrance to the furnace, each pipe terminating in a gas-feeding nozzle, the nozzles being positioned one above the other so that the two streams of gas will be directed into the furnace along converging lines in the same vertical plane, and means for independently swinging the nozzles in a vertical plane to vary the point of contact of the two streams, or to vary the inclination of the resulting fan-shaped flame with respect to the surface of the molten glass.

14. In a glass melting furnace, an enclosed passage for conducting heated air to the furnace, a pair of gas pipes projecting into the passage near its entrance to the furnace, each pipe terminating in a gas-feeding nozzle, the nozzles being positioned one above the other so that the two streams of gas will be directed into the furnace along converging lines in the same vertical plane, and means for water-cooling that portion of each gas-pipe within the passage.

15. In a glass melting furnace, an enclosed passage for conducting heated air to the furnace, the roof of the passage adjacent the entrance to the furnace being hinged so that the effective size of the passage opening, as well as the inclination at which air is delivered to the furnace, may be varied, a pair of gas pipes projecting into the passage near its entrance to the furnace, each pipe terminating in a gas-feeding nozzle, the nozzles being positioned one above the other so that the two streams of gas will be directed into the furnace along converging lines in the same vertical plane, and means for adjusting the nozzles to vary the inclination of the resulting fan-shaped flame with respect to the surface of the molten glass.

16. The method of applying heat to a glass-melting furnace, wherein two jets of gas one above the other are directed into the furnace along meeting lines in the same vertical plane, whereby the interfering flames are spread out laterally over the surface of the molten glass.

17. In a glass melting furnace, a gas passage leading to a port communicating with the melting chamber, and a pivoted member supported by the roof of said passage for varying the effective opening of the port.

18. In a glass melting furnace, a gas passage leading to a port communicating with the melting chamber, a pivoted member supported by the roof of said passage for varying the effective opening of the port, and means to maintain the said member at a relatively low temperature.

19. In a glass melting furnace, a gas passage leading to a port communicating with the melting chamber, a movable water-cooled refractory member supported by the roof of said port for varying the effective opening thereof, and means to hold the said member in the desired adjustment.

Signed at Charleston, in the county of Kanawha, and State of West Virginia, this 19th day of February, 1923.

BJARNE SCHIELDROP.